United States Patent
Lee et al.

(10) Patent No.: US 7,313,603 B2
(45) Date of Patent: *Dec. 25, 2007

(54) SYSTEM AND METHOD FOR SYNCHRONIZING UNSTRUCTURED DOCUMENTS

(75) Inventors: Chung-I Lee, Tu-chen (TW); Floye Lin, Shenzhen (CN); David Fan, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 839 days.

This patent is subject to a terminal disclaimer.

(21) Appl. No.: 10/335,375

(22) Filed: Dec. 30, 2002

(65) Prior Publication Data

US 2004/0049558 A1    Mar. 11, 2004

(30) Foreign Application Priority Data

Sep. 9, 2002    (TW) ............................... 91120394 A

(51) Int. Cl.
G06F 15/16    (2006.01)
(52) U.S. Cl. ...................................... 709/219; 709/203
(58) Field of Classification Search ................. 709/219
See application file for complete search history.

(56) References Cited

U.S. PATENT DOCUMENTS

| | | | | |
|---|---|---|---|---|
| 6,134,552 A | * | 10/2000 | Fritz et al. ..................... | 707/10 |
| 6,671,757 B1 | * | 12/2003 | Multer et al. ................ | 710/100 |
| 6,738,789 B2 | * | 5/2004 | Multer et al. ................ | 707/201 |
| 6,944,651 B2 | * | 9/2005 | Onyon et al. ................ | 709/217 |
| 6,976,030 B2 | * | 12/2005 | Lee et al. ............... | 707/103 R |
| 2003/0135557 A1 | * | 7/2003 | Davis .......................... | 709/206 |

* cited by examiner

Primary Examiner—Khanh Dinh
Assistant Examiner—Glenford Madamba
(74) Attorney, Agent, or Firm—Wei Te Chung

(57) ABSTRACT

A system for synchronizing unstructured documents includes sub-nodes (110, 120, 130) and a network connecting the sub-nodes together. Each sub-node includes a database server (113, 123, 133), an FTP (file transfer protocol) server, and client computers (111, 121, 131). The database server includes a summary table (400) for storing a summary of all unstructured documents, and has the function of synchronizing with summary tables stored in other sub-nodes. The FTP server stores unstructured documents, and has the function of downloading unstructured documents from the FTP servers of other sub-nodes. Each client computer includes a client proxy. The client proxy includes a database processing module for generating instructions on updating, searching, and deleting data stored in the database server, a file processing module for generating instructions on downloading unstructured documents from the FTP servers of other sub-nodes, and a client processing module for receiving sync orders from users.

10 Claims, 5 Drawing Sheets

| DOCUMENT ID | DOCUMENT TITLE | DOCUMENT LOCATION | DOCUMENT DIRECTORY | UPDATE TIME | ... |
|---|---|---|---|---|---|
| | | | | | |
| | | | | | |
| | | | | | |

SYSTEM AND METHOD FOR SYNCHRONIZING UNSTRUCTURED DOCUMENTS

BACKGROUND OF THE INVENTION

1. Field of the Invention

The present invention relates to a system and method for document synchronizing, and especially to a system and method for synchronizing distributed unstructured documents stored in a plurality of sub-nodes. This application relates to a contemporaneously filed application titled "SYSTEM AND METHOD FOR SYNCHRONIZING FILES IN MULTIPLE NODES" having the same assignee and partially the same inventors with the invention.

2. Background of the Invention

Globalized economic development has spawned and nurtured many multinational companies. Numerous multinational companies comprise a variety of departments distributed all over the world. Typically, a variety of information must be shared between the departments. Data management and information sharing have already become pivotal in running a multinational company efficiently. With the rapid development of electronic information technology, it has become commonplace for departments to access data and cooperate with each other over vast distances. Today, distributed database management systems are employed to enhance the efficiency of data access and to reduce error.

A distributed database management system has data stored in a variety of distributed physical locations, but with universal logical. Users can access data stored in a remote storage as data stored in a local storage. PRC Patent No. 00808249.9 discloses a system and method for managing documents in a distributed environment. In this invention, a document controller is used in a client computer to manage documents stored in a local storage, and to control exchange of information through a network. The document controller generates a meta-index to note locations of all documents. When a user accesses a document, the client computer obtains the location of the document, copies the document to the local storage, and modifies the meta-index.

The problems of synchronizing updating of documents and of over-processing in some client computers are resolved by this invention. But other problems are manifest. For example, data are repeatedly stored in the client computers, the sync process is prone to incur steep online fees, and adding client computers to the system is problematic.

SUMMARY OF THE INVENTION

Accordingly, an objective of the present invention is to provide a system for synchronizing distributed unstructured stored documents in a plurality of sub-nodes.

Another objective of the present invention is to provide a method for synchronizing distributed unstructured stored documents in a plurality of sub-nodes.

In order to achieve the first above-mentioned objective, a system for synchronizing unstructured documents in accordance with a preferred embodiment of the present invention comprises a plurality of sub-nodes and a network connecting the sub-nodes together. Each sub-node comprises a database server, an FTP server, and a plurality of client computers. The database server comprises a summary table for storing a summary of all unstructured documents, and has the function of synchronizing with summary tables stored in other sub-nodes. The FTP server stores unstructured documents, and has the function of downloading unstructured documents from the FTP servers of other sub-nodes. Each client computer comprises a client proxy. The client proxy comprises a database processing module for generating instructions on updating, searching, and deleting data stored in the database server, a file processing module for generating instructions on downloading unstructured documents from the FTP servers of other sub-nodes, and a client processing module for receiving sync orders from users.

In order to achieve the second above-mentioned objective, a method for synchronizing unstructured documents in accordance with a preferred embodiment of the present invention comprises the steps of: (a) synchronizing periodically summary tables of all unstructured documents between a plurality of sub-nodes; (b) sending a document sync message from a first sub-node to a second sub-node where a latest edition of the document is located; (c) downloading the latest edition of the document from the second sub-node; and (d) modifying the summary table of all unstructured documents stored in the first sub-node.

Other objects, advantages and novel features of the present invention will be drawn from the following detailed description of preferred embodiments of the present invention with the attached drawings, in which:

DETAILED DESCRIPTION OF PREFERRED EMBODIMENTS OF THE INVENTION

Reference will now be made to the drawings to describe the present invention in detail.

Figure 1:
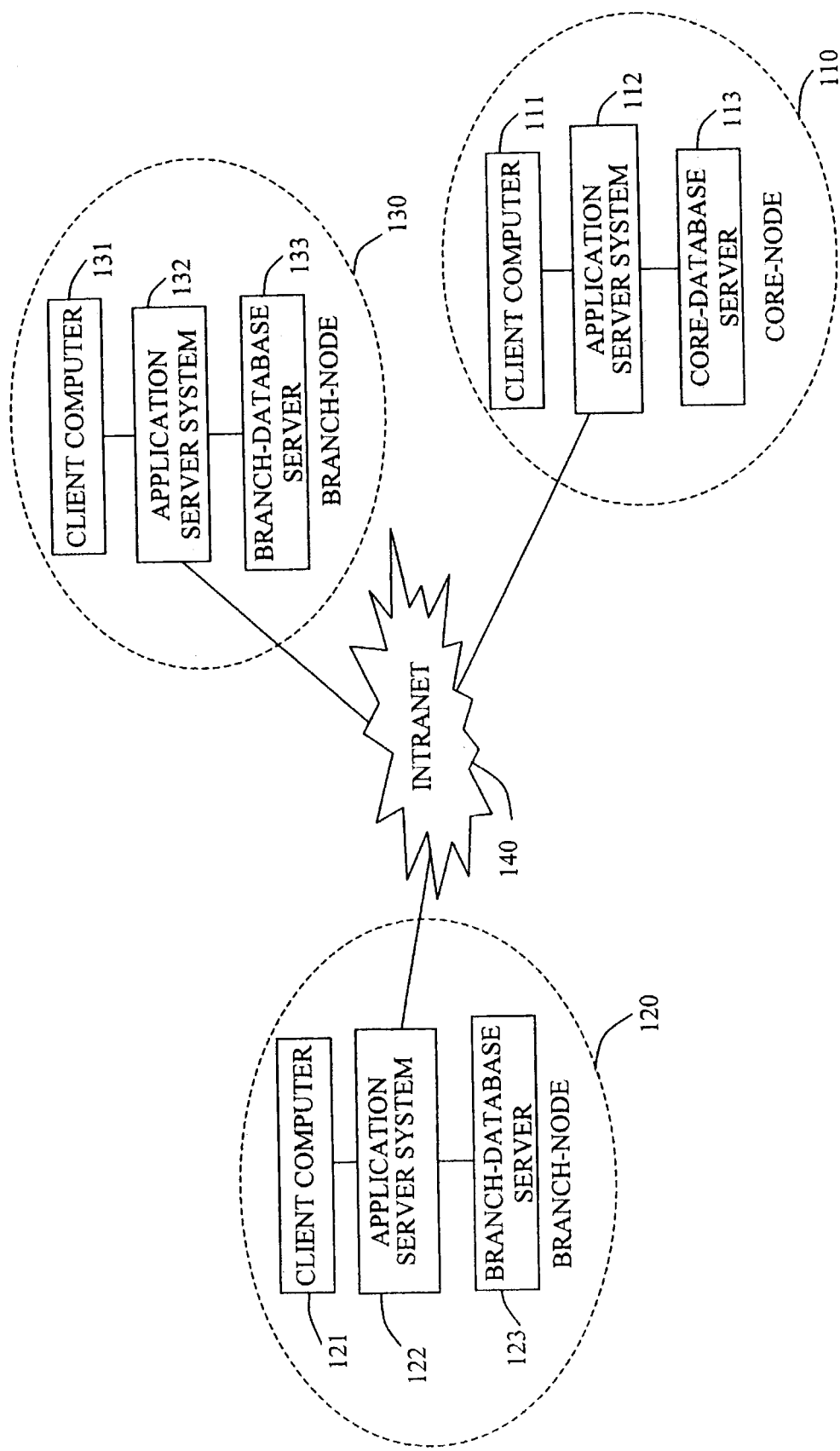
FIG. 1 is a schematic diagram of a system for synchronizing unstructured documents in accordance with a preferred embodiment of the present invention, the system comprising a core-node, a plurality of branch-nodes and an intranet connecting them together.

FIG. 1 is a schematic diagram of a system for synchronizing unstructured documents in accordance with a preferred embodiment of the present invention. The system comprises a plurality of sub-nodes, including a core-node 110 and a plurality of branch-nodes. In the preferred embodiment, two branch-nodes 120, 130 are described and shown. The sub-nodes 110, 120, 130 are connected together by an intranet 140. Each of the sub-nodes 110, 120, 130 comprises a three-tier information system. For example, the three-tier information system of the core-node 110 comprises a core-database server 113 (the bottom tier), an application server system 112 (the middle tier), and a plurality of distributed client computers 111 (the top tier, only one shown).

The core-node 110 is now described in detail below, as exemplifying the apparatus and function of each of the sub-nodes. The application server system 112 of the core-node 110 comprises core and mutable enterprise logic (such as rules, execution, and management) of the system. The application server system 112 processes input of users, and returns results of processing to users. The core-database server 113 manages processing of data stored in a database located therein. Such processing includes reading, writing, deleting, modifying, and backup. Each of the client computers 111 has the function of receiving sync orders input by users, and displaying results of implementation of such orders. The structure of each of the branch-nodes 120, 130 is the substantially the same as the structure of the core-node 110. In the branch-nodes 120, 130 as shown in FIG. 1, like reference numerals are used to designate identical or corresponding parts.

Figure 2:
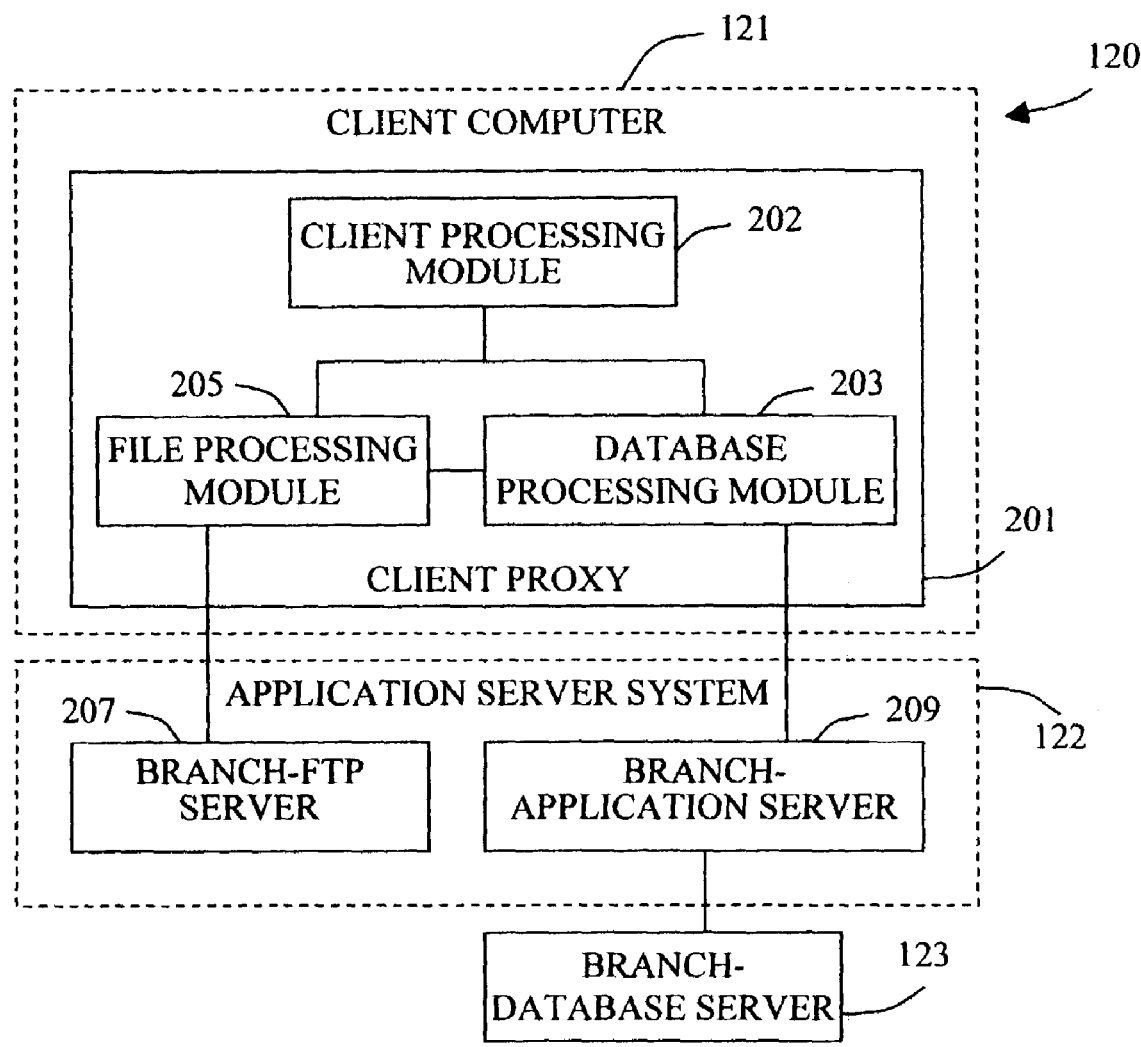
FIG. 2 is a schematic block diagram of function modules of one branch-node of the system of FIG. 1.

FIG. 2 is a schematic block diagram of function modules of the branch-node 120. The client computer 121 of the branch-node 120 comprises a client proxy 201. The client proxy 201 separates executions for users from executions for the system, to simplify executions for users. The client proxy 201 comprises a client processing module 202, a file processing module 205, and a database processing module 203. The application server system 122 of the branch-node 120 comprises a branch-FTP (File Transfer Protocol) server 207 and a branch-application server 209.

The client processing module 202 provides a GUI (Graphical User Interface) for users to input file processing orders. The file processing orders include read, edit, copy, save, new file, delete file, and so on. The client processing module 202 connects with the file processing module 205 and the database processing module 203. The client processing module 202 receives the file processing orders from the users, and sends the file processing orders to the file processing module 205 and the database processing module 203 for implementation, and controls the file processing procedure. The database processing module 203 connects with the branch-database server 123 via the branch-application server 209. The database processing module 203 generates instructions for searching, updating and deleting data stored in the branch-database server 123 according to the file processing orders, and sends results of implementation of the file processing orders to the file processing module 205. The file processing module 205 connects with the branch-FTP server 207, and receives the results from the database processing module 203.

The branch-FTP server 207 stores unstructured documents. For example, documents in various formats such as image, word, sound and other media. The branch-FTP server 207 connects with the core-node 110 via the intranet 140, and can exchange documents with the core-node 110. The branch-application server 209 is used for connecting the client computer 121 with the branch-database server 123. The branch-application server 209 sends database processing orders received from the database processing module 203 to the branch-database server 123, and returns the results of such processing to the database processing module 203.

The branch-database server 123 comprises a summary table (not shown in FIG. 2), which stores a summary of all unstructured documents stored in all FTP servers in the form of structured data. The summary includes ID, location, directory and update time of each document. The summary in the branch-database server 123 can be updated in accordance with a summary table in the core-database server 113 periodically; for example, once every three minutes.

Figures 3, 4:
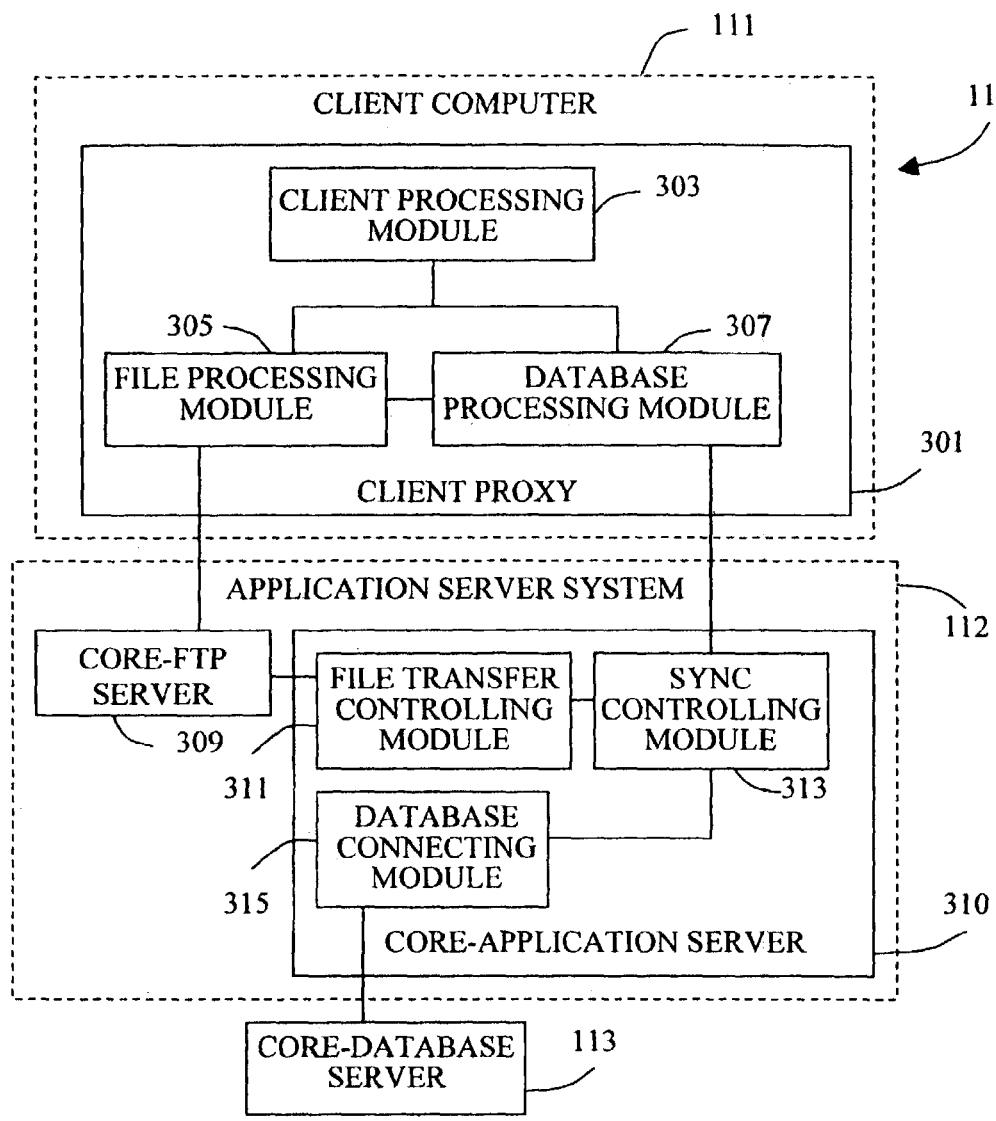
FIG. 3 is a schematic block diagram of function modules of the core-node of the system of FIG. 1.
FIG. 4 is an exemplary summary table for storing information on distributed stored documents, according to the system of FIG. 1.

FIG. 3 is a schematic block diagram of function modules of the core-node 110. The client computer 111 of the core-node 110 comprises a client proxy 301. The client proxy 301 further comprises a client processing module 303, a file processing module 305, and a database processing module 307. The client computer 111 and the core-database server 113 of the core-node 110 are substantially the same as the client computer 121 and the branch-database server 123 of the branch-node 120 in structure and function (see the description above in relation to FIG. 2).

The application server system 112 comprises a core-FTP server 309 and a core-application server 310. The core-FTP server 309 stores unstructured documents. For example, documents in various formats such as image, word, sound and other media. The core-FTP server 309 connects with the branch-FTP server 207 of the branch-node 210 via the intranet 140, and can exchange documents and sync requests with the branch-FTP server 207. The core-application server 310 is a controller of the sync process, and comprises a file transfer controlling module 311, a sync controlling module 313 and a database connecting module 315.

The sync controlling module 313 controls execution of the sync process, and connects with the file transfer controlling module 311 and the database connecting module 315. The sync controlling module 313 generates a plurality of sync orders in accordance with a sync request received from the file transfer controlling module 311. The sync orders include transferring data and updating data stored in the core-database server 113. These orders are transferred to the file transfer controlling module 311 and the database connecting module 315 for execution. The file transfer controlling module 311 connects with the core-FTP server 309, and sends sync requests received from the core-FTP server 309 to the sync controlling module 313. The file transfer controlling module 311 has the function of converting sync orders received from the sync controlling module 313 into instructions that can be executed by the core-FTP server 309. The database connecting module 315 is used to convert an updating order received from the sync controlling module 313 into an instruction that can be executed by the core-database server 113.

FIG. 4 is an exemplary summary table 400 for storing information on distributed stored documents. The summary table 400 is stored in the core-database server 113, and comprises columns as follows: document ID 401, document title 403, document location 405, document directory 407, and update time 409.

The document ID 401 is one of a designated set of numbers for various documents stored in the information system of an enterprise. Each of the documents has a unique document ID. The IDs are allocated by the information system. The document title 403 records a description of each document. The document location 405 records the IP (Internet Protocol) address of an FTP server where a document is located; for example, 10.153.24.126. The document directory 407 records a directory of a document in a corresponding FTP server. The update time 409 records a time of last editing of a document.

The summary tables 400 in the core-node 110 and the branch-nodes 210, 310 are synchronized periodically; for example, every three minutes. The sync process is performed in accordance with the update times of a document. Different records of the document may exist in the core-node 110 and the branch-nodes 210, 310. Nevertheless, each record of the document has the same document ID. For example, if the update time of a first record of a document recorded in the summary table 400 stored in the core-node 110 is later than the update time of a second record of the same document recorded in the summary table 400 stored in the branch-node 210, the first record in the summary table 400 stored in the branch-node 210 is retained, and the second record in the summary table 400 stored in the core-node 110 is replaced by the first record.

Figure 5:
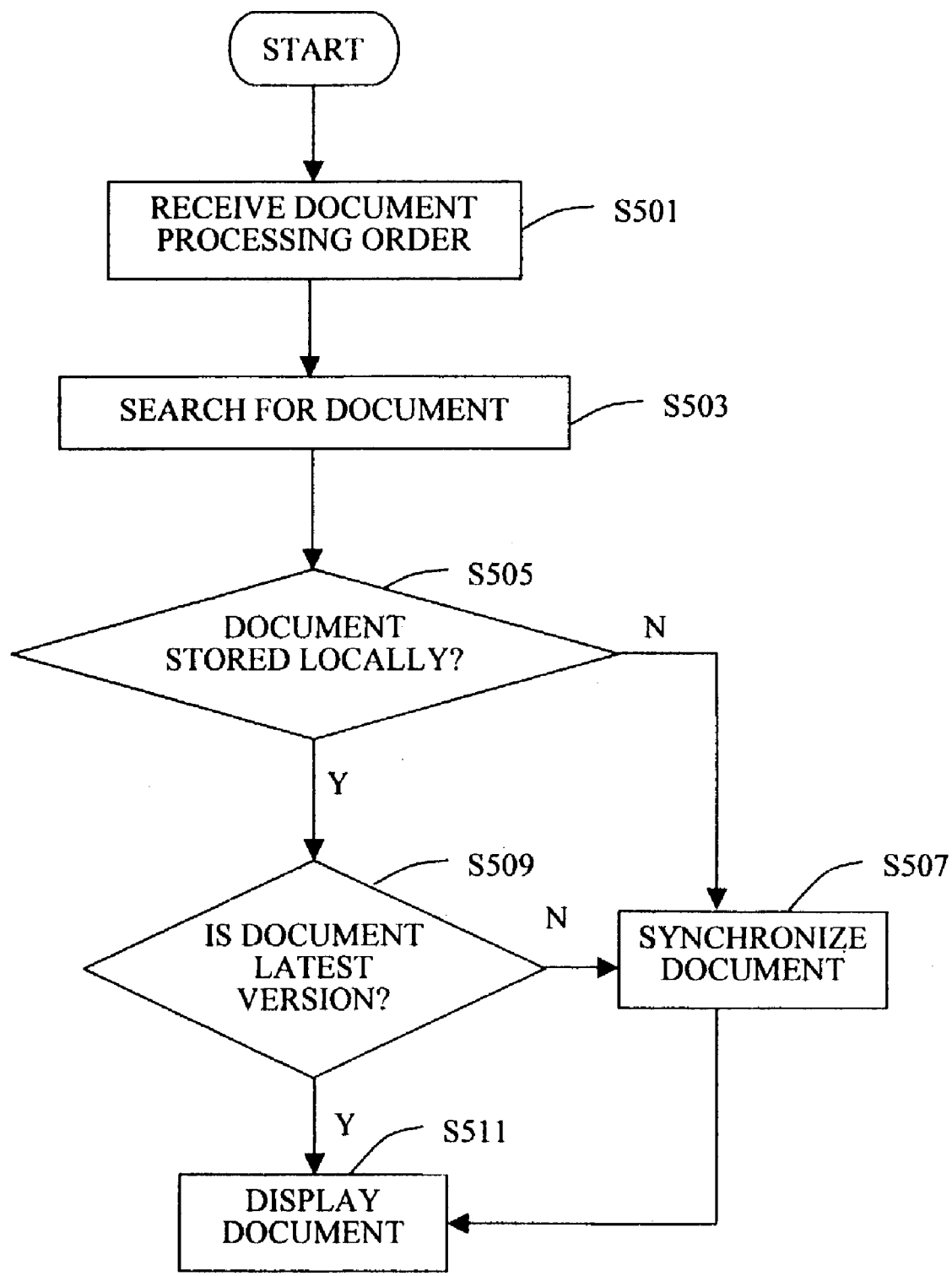
FIG. 5 is a flow chart of document reading in a client computer in accordance with a preferred embodiment of the present invention.

FIG. 5 is a flow chart of document reading in a client computer in accordance with a preferred embodiment of the present invention. Firstly, in step S501, the client processing module 202 of the client computer 121 receives a document processing order from a user through the GUI of the client processing module 202, and sends the document processing order to the database processing module 203. The processing order may, for example, be reading or editing a document. The database processing module 203 converts the document processing order into an instruction that can be implemented by the branch-database server 123, and sends the instruction to the branch-database server 123. In step S503, the branch-database server 123 implements the instruction received from the database processing module 203 to search for the document, and returns a search result to the file processing module 205 via the database processing module 203. The search result includes one or more rows in the summary table 400.

In step S505, the file processing module 205 searches for the location of the document in the search result received from the database processing module 203, and determines whether the document is stored in the branch-FTP server 207. If the document is not stored in the branch-FTP server 207, in step S507 the procedure of synchronizing the document is implemented, whereupon the procedure proceeds directly to step S511 described below. If the document is stored in the branch-FTP server 207, in step S509, the file processing module 205 determines whether the document stored in the branch-FTP server 207 is the latest edition. If the document stored in the branch-FTP server 207 is the latest edition, the procedure proceeds directly to step S511 described below. If the document stored in the branch-FTP server 207 is not the latest edition, the procedure proceeds to step S507 described above. In step S511, the file processing module 205 displays the document for the user.

Figure 6:
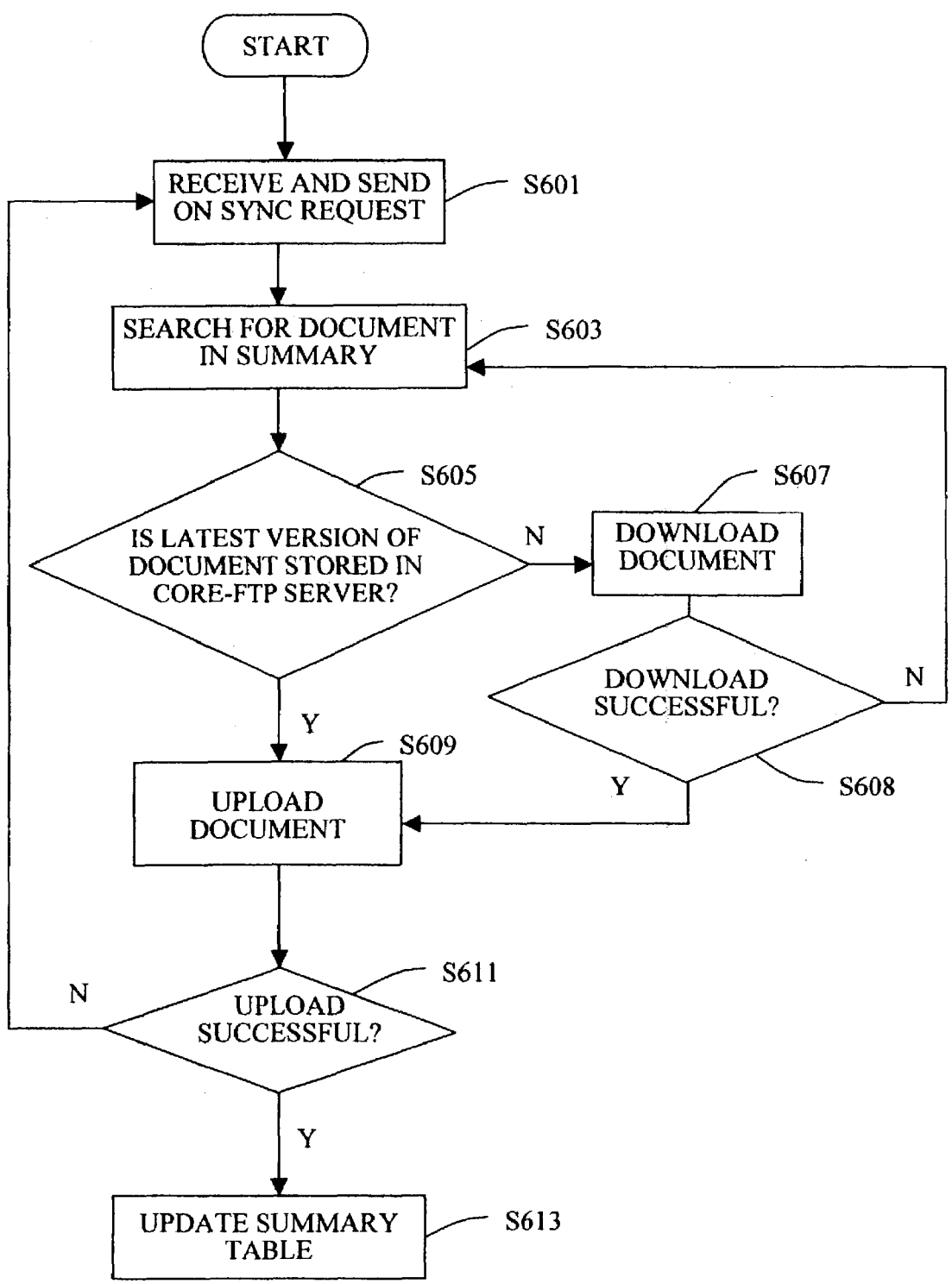
FIG. 6 is a flow chart of details of one step of FIG. 5, namely synchronizing a document.

FIG. 6 is a flow chart of details of step S507 of FIG. 5, namely synchronizing a document. Firstly, in step S601, the branch-FTP server 207 sends a sync request to the core-FTP server 309. The core-FTP server 309 sends the sync request on to the sync controlling module 313 of the core-application server 310. In step S603, the sync controlling module 313 converts the sync request into a query to search for the location of the document, and sends the query to the database connecting module 315. The database connecting module 315 converts the query into an instruction that the core-database server 113 can implement, and sends the instruction to the core-database server 113. The core-database server 113 implements the instruction to search for the location of the document in the summary table 400, and returns a result on the search to the sync controlling module 313 via the database connecting module 315. The search result includes one or more rows in the summary table 400.

In step S605, the sync controlling module 313 determines whether the latest edition of the document is stored in the core-FTP server 309 in accordance with the search result. If the latest edition is stored in the core-FTP server 309, the procedure proceeds directly to step S609 described below. If the latest edition is not stored in the core-FTP server 309, in step S607, the sync controlling module 313 generates an order for downloading the document. The order includes the location of the latest edition of the document. The file transfer controlling module 311 converts the order received from the sync controlling module 313 into an instruction for downloading the document, and sends the instruction to the core-FTP server 309. The core-FTP server 309 downloads the document from the FTP server where the document is located, and stores the document in the core-FTP server 309. In step S608, the core-FTP server 309 determines whether the document is successfully downloaded. If the document is successfully downloaded, the core-FTP server 309 sends a "successful download" message to the sync controlling module 313, and the procedure proceeds to step S609 described below. If the document is not successfully downloaded, the core-FTP server 309 sends a "download failure" message to the sync controlling module 313, and the procedure returns to step S603 described above.

In step S609, the sync controlling module 313 generates a document uploading order. The file transfer controlling module 311 converts the order received from the sync controlling module 313 into an instruction, and sends the instruction to the core-FTP server 309. The core-FTP server 309 implements the instruction to upload the document to the branch-FTP server 207. In step S611, the core-FTP server 309 determines whether the document is successfully uploaded. If the document is successfully uploaded, the core-FTP server 309 sends a "successful upload" message to the sync controlling module 313, and the procedure proceeds to step S613 described below. If the document is unsuccessfully uploaded, the core-FTP server 309 sends an "upload failure" message to the sync controlling module 313, and the procedure returns to step S601 described above. In step S613, the sync controlling module 313 generates an order to update the summary table 400 stored in the core-database server 113.

Although only preferred embodiments of the present invention have been described in detail above, those skilled in the art will readily appreciate that many modifications to the preferred embodiments are possible without materially departing from the novel teachings and advantages of the present invention. Accordingly, all such modifications are deemed to be covered by the following claims and allowable equivalents of the claims.

What is claimed is:

1. A system for synchronizing unstructured documents, the system comprising a plurality of sub-nodes and a network connecting the sub-nodes together, wherein:

each of the sub-nodes comprises a file transfer protocol (FTP) server, an application server system, a database server, and a plurality of client computers, wherein:

the database server comprises a summary table for storing a summary of all unstructured documents and for recording Internet Protocol addresses of locations of the unstructured documents, and has a function of synchronizing with the summary table stored in one or more other sub-nodes;

the FTP server stores unstructured documents, and has a function of sending sync requests and downloading unstructured documents from the FTP server of one or more other sub-nodes;

the application server system comprises a sync controlling module configured for generating sync orders in accordance with the sync requests, and a file transfer controlling module configured for converting the sync orders into instructions on downloading the unstructured documents and sending the instructions to the FTP server; and each of the client computers comprises a client proxy, the client proxy comprises a client processing module, a database processing module, and a file processing module, wherein:

the client processing module is configured for receiving file processing orders, and for sending the file processing orders to the database processing module for implementation;

the database processing module is configured for generating instructions on updating, searching, and deleting data stored in the database server according to the file processing orders, and for sending results of the implementation of the instructions to the file processing module; and the file processing module is configured for receiving the results from the database processing module.

2. The system as claimed in claim 1, wherein each of the summary tables includes columns for ID, title, location, directory and update time of the documents.

3. The system as claimed in claim 1, wherein each of the summary tables is periodically updated.

4. The system as claimed in claim 1, wherein the distributed stored documents include various formats including any one or more of image, words sound and other media.

5. A method for synchronizing unstructured documents, the method comprising the steps of:

synchronizing periodically summary tables of all unstructured documents between a plurality of sub-nodes, wherein each summary table stores a summary of all unstructured documents and records Internet Protocol addresses of locations of the unstructured documents;

sending a sync request from a first sub-node to a second sub-node where a latest edition of the unstructured document is located, the sending step comprising:

generating a sync order for a particular unstructured document in accordance with the sync request;

searching for a summary of the unstructured document in the summary table to find a location of the unstructured document; and determining that the unstructured document in the second sub-node is the latest edition according to the location;

downloading the latest edition of the unstructured document from the second sub-node; and modifying the summary table of all unstructured documents stored in the first sub-node.

6. The method as claimed in claim 5, wherein each of the summary tables includes columns for ID, title, location, directory and update time of the unstructured documents.

7. A method of synchronizing unstructured documents at different Internet Protocol (IP) addresses, comprising the steps of:

providing a plurality of sub-nodes with different versions of one of said unstructured documents;

synchronizing periodically a summary table of all versions of said unstructured document among said sub-nodes, in a local sub-node, wherein each summary table stores a summary of all said unstructured documents and records Internet Protocol addresses of locations of said unstructured documents;

requesting one specific version of said unstructured document;

searching for a summary of said unstructured document in said summary table to find a location of said unstructured document;

determining that said unstructured document in another sub-node is said specific version according to the location;

downloading said specific version of said unstructured document from either said local sub-node or said another sub-node according to said summary table; and updating said summary table.

8. The system as claimed in claim 1, wherein the client proxy is configured for separating executions for users from executions for the system so as to simplify executions for users.

9. The method as claimed in claim 5, wherein the sending step further comprises the step of:

converting the sync order into an instruction for downloading the unstructured document.

10. The method as claimed in claim 5, further comprising the step of:

uploading the latest edition of the unstructured document to the second sub-node if the latest edition of the unstructured document is not located in the second sub-node.

* * * * *